United States Patent
Ish et al.

(10) Patent No.: US 10,275,361 B2
(45) Date of Patent: Apr. 30, 2019

(54) MANAGING MULTIPLE NAMESPACES IN A NON-VOLATILE MEMORY (NVM)

(71) Applicant: Seagate Technology LLC, Cupertino, CA (US)

(72) Inventors: Mark Ish, Sandy Springs, GA (US); Steven S. Williams, Longmont, CO (US); Jeffrey Munsil, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/609,758

(22) Filed: May 31, 2017

(65) Prior Publication Data

US 2018/0349285 A1 Dec. 6, 2018

(51) Int. Cl.
*G06F 12/10* (2016.01)

(52) U.S. Cl.
CPC ...... *G06F 12/10* (2013.01); *G06F 2212/7201* (2013.01)

(58) Field of Classification Search
CPC .......................... G06F 2212/7201; G06F 12/10
USPC ........................................................ 711/103
See application file for complete search history.

(56) References Cited

U.S. PATENT DOCUMENTS

| | | | |
|---|---|---|---|
| 9,003,071 B2 | 4/2015 | Liu | |
| 9,294,567 B2 | 3/2016 | Hussain et al. | |
| 9,384,093 B1 | 7/2016 | Aiello | |
| 2013/0080732 A1* | 3/2013 | Nellans | G06F 12/0246 |
| | | | 711/206 |
| 2015/0317088 A1 | 11/2015 | Hussain et al. | |
| 2015/0319243 A1 | 11/2015 | Hussain et al. | |
| 2016/0342463 A1 | 11/2016 | Oshima | |

* cited by examiner

*Primary Examiner* — Hua J Song (74) *Attorney, Agent, or Firm* — Hall Estill Attorneys at Law (57) ABSTRACT

Apparatus and method for managing namespaces in a Non-Volatile Memory Express (NVMe) controller environment. A non-volatile memory (NVM) is arranged to store map units (MUs) as addressable data blocks in one or more namespaces. A forward map has a sequence of map unit address (MUA) entries that correlate each of the MUs with the physical locations in the NVM. The MUA entries are grouped into immediately adjacent, contiguous ranges for each of the namespaces. A base MUA array identifies the address, within the forward map, of the beginning MUA entry for each namespace. A new namespace may be added by appending a new range of the MUA entries to the forward map immediate following the last MUA entry, and by adding a new entry to the base MUA array to identify the address, within the forward map, of the beginning MUA entry for the new namespace.

20 Claims, 7 Drawing Sheets

MANAGING MULTIPLE NAMESPACES IN A NON-VOLATILE MEMORY (NVM)

SUMMARY

Various embodiments of the present invention are generally directed to data management in a data storage device.

In some embodiments, a non-volatile memory (NVM) is arranged to store map units (MUs) as addressable data blocks in one or more namespaces. A forward map has a sequence of map unit address (MUA) entries that correlate each of the MUs with the physical locations in the NVM. The MUA entries are grouped into immediately adjacent, contiguous ranges for each of the namespaces. A base MUA array identifies the address, within the forward map, of the beginning MUA entry for each namespace. A new namespace may be added by appending a new range of the MUA entries to the forward map immediate following the last MUA entry, and by adding a new entry to the base MUA array to identify the address, within the forward map, of the beginning MUA entry for the new namespace.

These and other features and advantages which characterize various embodiments of the present disclosure can be understood in view of the following detailed discussion and the accompanying drawings.

DETAILED DESCRIPTION

The present disclosure generally relates to data storage, and more particularly to a method and apparatus for managing namespaces in a data storage device.

The Non-Volatile Memory Express (NVMe) Specification is an interface standard that has been recently introduced to manage high speed accesses in data storage systems that utilize a Peripheral Component Interconnect Express (PCIe) serial bus configuration. NVMe is particularly optimized for enterprise and client solid state drive (SSD) environments by providing direct Input/Output (I/O) access to the local non-volatile memory (NVM). NVMe helps to reduce latency of read and write operations by supporting deep command queues, simplified command decoding and processing, and robust error reporting and handling.

One feature of the NVMe standard is the ability of the host to specify regions of storage as separate namespaces. Generally, a namespace is defined as an addressable domain in the NVM having a selected number of storage blocks that have been formatted for block access. A namespace can constitute a portion of an SSD, the entirety of the SSD, or a multi-device memory space that spans multiple SSDs or other data storage devices. A namespace ID (NSID) is a controller unique identifier for the associated namespace (NS). A host can access a particular NVM by specifying the namespace, the controller ID and an associated logical address for the block or blocks (such as logical block addresses, LBAs).

While operable to enhance parallel data transfer paths within a data storage device (or a group of such devices), the subdivision of an available NVM in an SSD or other device into multiple namespaces presents a number of challenges for the controller(s) to process updates to various map structures used to locate the data. This is particularly the case when new namespaces are added to an existing device configuration, or when existing namespaces are deleted from the existing device configuration.

Accordingly, various embodiments of the present disclosure are generally directed to an apparatus and method for managing map data in an NVMe controller environment. As explained below, in some embodiments data are stored in a non-volatile memory (NVM) in the form of addressable blocks, or map units (MUs), of selected size. A forward map is maintained as a data structure in a memory that provides map data to correlate each of the MUs with the physical locations in the NVM at which the MUs are stored. The NVM is divided into at least one namespace in accordance with the NVMe specification.

A map unit address (MUA) array is configured to identify a beginning block address within the forward map for each of the namespaces in the NVM. New entries are supplied to the MUA array for each new namespace added to the NVM, with each new namespace immediately following the last entry of the previously most recently added namespace.

An existing namespace is deleted by removing the entry from the MUA array and, as required, shifting down the existing pointers to the forward map. In this way, the forward map remains contiguous without fragmentation, eliminating the need for a secondary lookup table and reducing other system latencies when namespaces are added or removed from the system.

Figure 1:
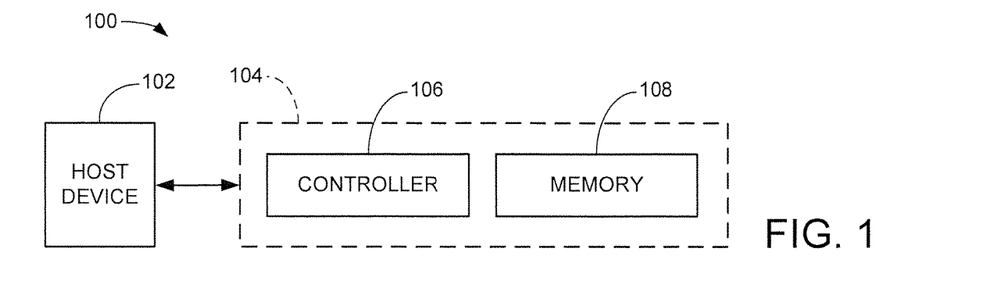
FIG. 1 provides a functional block representation of an exemplary data storage device in accordance with various embodiments of the present disclosure.

These and other features and advantages of various embodiments can be understood beginning with a review of FIG. 1 which provides a data processing system 100. The system 100 includes a host device 102 and a data storage device 104. The data storage device 104 includes a controller 106 and a memory module 108. The controller provides top level communication and control functions for data transfers to and from NVM storage in the memory module 108. The data transfers between the host device and the data storage device are provided via one or more PCIe ports.

Figure 2:
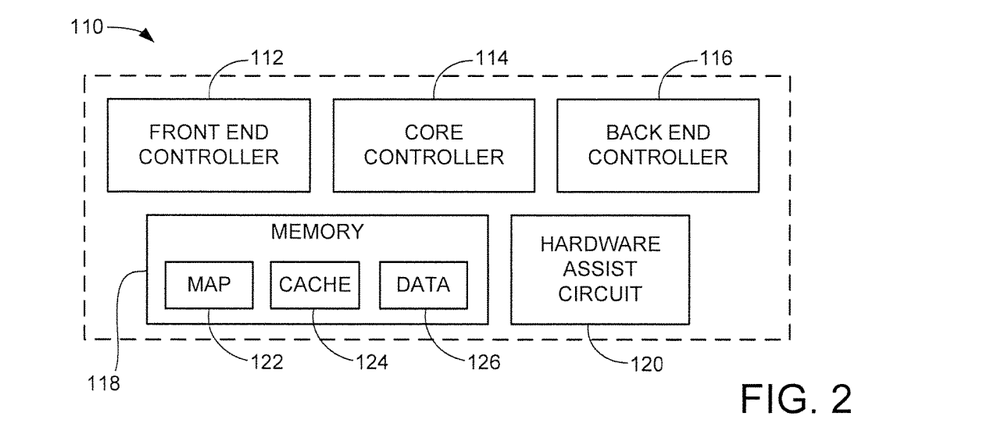
FIG. 2 shows aspects of the data storage device of FIG. 1 configured as a solid state drive (SSD) in accordance with some embodiments.

While not limiting, it is contemplated for the current example that the data storage device 104 is a solid state drive (SSD) with a controller configuration 110 as generally set forth by FIG. 2. The controller configuration includes a front end controller 112, a core controller 114 and a back end controller 116. The front end controller 112 performs host I/F functions, the back end controller 116 directs data transfers with the NVM memory and the core controller 114 provides top level control for the device.

Each controller 112, 114 and 116 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less than three programmable processors) can be configured to carry out each of the front end, core and back end processes using associated FW in a suitable memory location. A pure hardware based controller configuration can also be used.

A memory 118 represents various forms of volatile and non-volatile memory (e.g., SRAM, DDR DRAM, flash, etc.) utilized as local memory by the controller 110. Various data structures and data sets may be stored by the memory including one or more map structures 120, one or more caches 122 for map data and other control information, and one or more data buffers 124 for host data during data transfers. A non-processor based hardware assist circuit 126 may enable the offloading of certain memory management tasks by one or more of the controllers as required.

Figure 3:
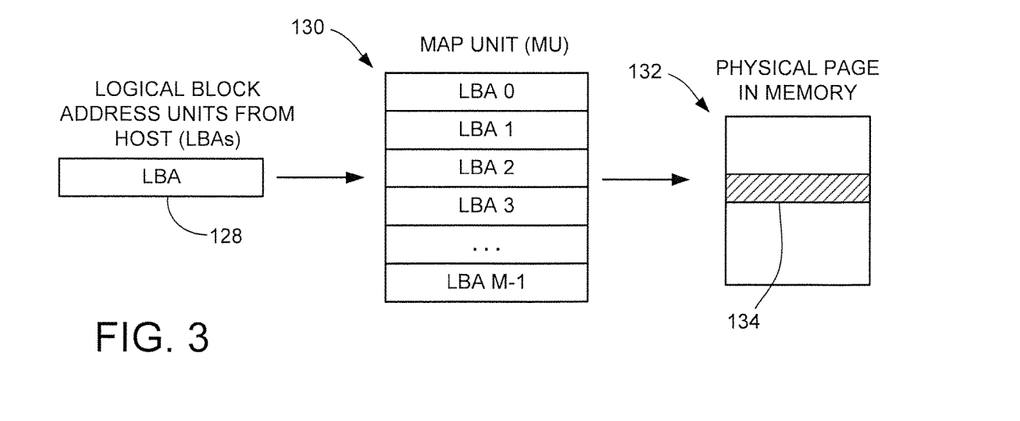
FIG. 3 shows an exemplary manner in which data are stored by the SSD of FIG. 2 in some embodiments.

FIG. 3 provides a schematic overview of a general manner in which host data (e.g., user data) are stored to the SSD NVM in some embodiments. Fixed sized data blocks referred to as sectors or logical block addresses (LBAs) 128 are provided by a host device for storage to the NVM. The LBAs 128 each have a fixed amount of user data (sector size), such as 512 Bytes (B), 1024B (1 KB), 2048B (2 KB), etc.

It will be recognized that the term "LBA" is somewhat ambiguous; under different circumstances it is common to use the term LBA to refer to the data block in its entirety, the user data portion of the block, and/or the logical address of the block. For clarity of the present discussion, the term LBA will signify the block (contents) and the term LBA ID, HLBA (host LBA) or namespace HLBA will refer to a logical address associated with the associated block. The HLBA values are supplied by the host with various access commands to transfer the data, and typically range from a minimum value (e.g., HLBA 0) to a maximum value (HLBA N).

The LBAs 128, also sometimes referred to as addressable units (AUs), are grouped together into a larger data block referred to as a map unit (MU) 130 to achieve a larger overall fixed sector size such as 4096B (4 KB) of user data. For example, using an AU size of 1 KB would result in the combining of four such AUs to form an MU of 4 KB. In some embodiments, two 512B sectors (LBAs) can be combined into a single AU of 1 KB, and then four AUs can be used to form the 4 KB MU. Factors include the preferred block size used by the host and the level of granularity for various control information maintained by the SSD 104. The HLBAs in a given MU will usually be consecutive although such is not necessarily required. The data contents of the LBAs may be accumulated in the local data buffer memory 126 until a full MU can be formed.

Once an MU is formed, a transfer operation is performed to transfer the MU 130 to the NVM, such as a selected page (row) 132 in an erasure block 134 of NAND flash memory. The MU 130 represents the smallest unit of memory that is written to or read from the NVM 104. Should a read request be provided for less than all of the LBAs/AUs in a given MU 130, the MU will be retrieved and decoded and the SSD will forward the requested portion of the data to the host.

While FIG. 3 shows the management of MUs of 4 KB in size, such is merely exemplary and is not limiting. Other sizes may be used. Additional bytes of control data will be written to or otherwise associated with the page 132 in the NVM. In one embodiment, each page has an additional group of 1872B of memory to accommodate various types of control data associated with the 4 KB of user data such as LDPC (low density parity code) values, logical values, namespace information, etc.

Figure 4:
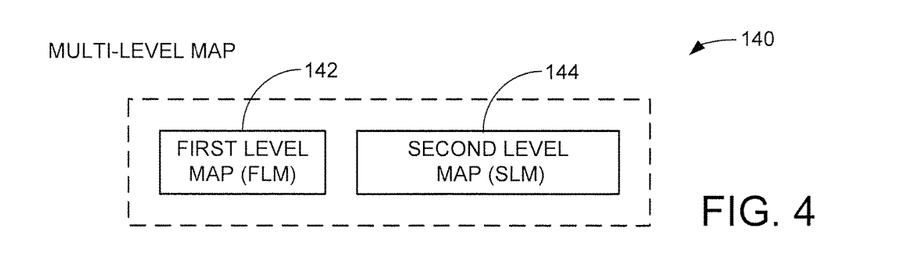
FIG. 4 shows an exemplary format for a multi-level map structure used by the SSD in some embodiments.

FIG. 4 shows a multi-level map 140 that can be used to track the locations of the various MUs 130 in the NVM. The map 140 is shown as a multi-level map, with a first level map 142 and a second level map 144. This is merely for purposes of illustration and is not limiting, as other map structures can readily be used including a single level map or a multi-level map with more than two levels.

Figure 5:
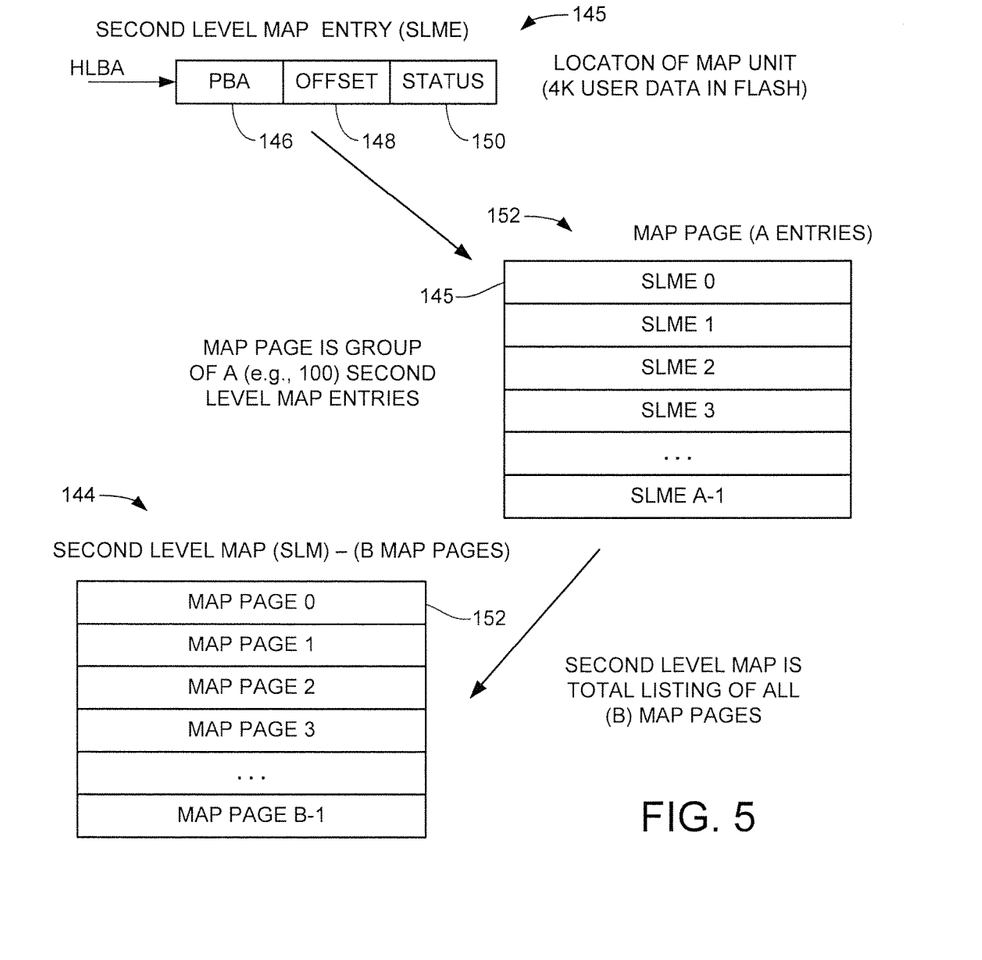
FIG. 5 shows an exemplary format for a second level map (SLM) of the map structure.

An example arrangement of the second level map (SLM) 144 is illustrated in FIG. 5. The SLM 144 is made up of a number of second level map entries 145 (SLMEs or entries), which describe individual blocks of user data (e.g., MUs 130) resident in, or that could be written to, the NVM. The SLM 144 describes the entire possible range of logical addresses of blocks that can be accommodated by the NVM, even if certain logical addresses have not been, or are not, used.

Each entry 145 includes a number of fields, including a physical block address field 146, an offset field 148 and a status field 150. Other formats may be used. An associated HLBA value (or a value derived from the HLBA value) is used as an index into the entry 145.

As noted above, a typical flash array arranges the MUs arranged as pages which are written along rows of flash memory cells in a particular erasure block. The PBA may be expressed in terms of array, die, garbage collection unit (GCU), erasure block, page, etc. The offset value may be a bit offset along a selected page of memory. The status value may indicate the status of the associated block (e.g., valid, invalid, null, etc.).

Groups of entries 145 may be arranged into larger sets of data referred to herein as map pages 152. Some selected number of entries (represented by the variable A) are provided in each map page. In the present case, each map page 152 has a total of 100 entries. Other groupings of entries can be made in each page, including numbers that are a power of 2.

It follows that the second level map (SLM) 144 constitutes an arrangement of all of the map pages 152 in the system. It is contemplated that some large total number of map pages B will be necessary to describe the entire storage capacity of the SSD. Each map page has an associated map ID value, also referred to herein as a map unit address (MUA). The MUAs range consecutively from 0 to B. The SLM 144 is stored in the NAND flash NVM, although the SLM will likely be written across different sets of the various dies rather than being in a centralized location within the flash.

Figure 6:
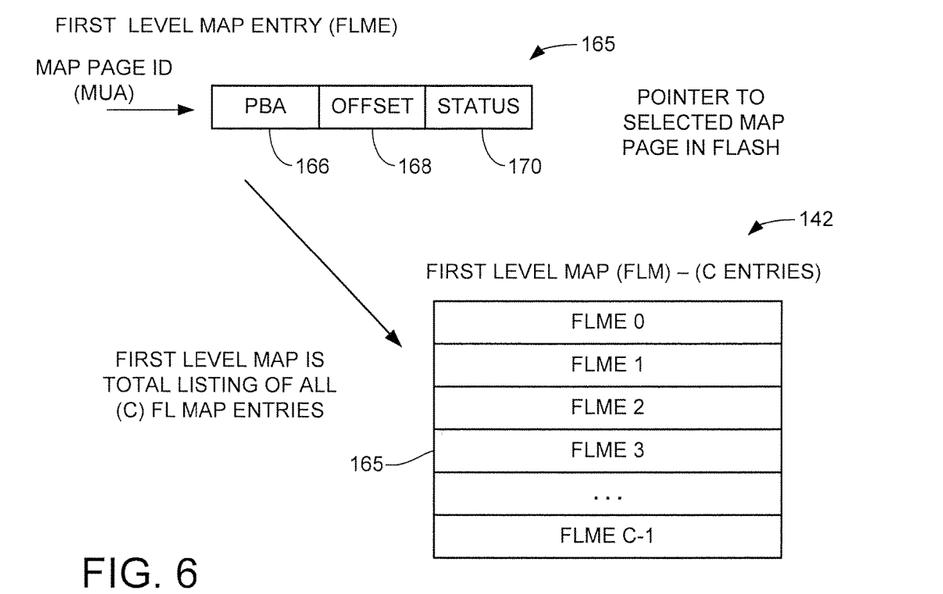
FIG. 6 shows an exemplary format for a first level map (FLM) of the map structure.

An arrangement of the first level map (FLM) 142 from FIG. 4 is shown in FIG. 6. The FLM 142 enables the SSD to locate the various map pages 152 stored to flash. To this end, the FLM 142 is made up of first level map entries 165 (FLMEs or entries). Each FLME 165 has a PBA field 166, offset field 168 and status field 170. The map page ID (MUA) discussed above is used as an index into the FLM 140 to locate the associated entry.

The PBA in field 166 describes the location of the associated map page. The offset value operates as before as a bit offset along a particular page or other location. The status value may be the same as in the second level map, or may relate to a status of the map page itself as desired. As before, the MUA be used as an index into the data structure to locate the associated entries.

The first level map (FLM) 142 constitutes an arrangement of all of the entries 162 from entry 0 to entry C. In some cases, B will be equal to C, although these values may be different. Accessing the FLM 142 allows a search, MUA, of the location of a desired map page within the flash memory 118. Retrieval of the desired map page from flash will provide the second level map entries in that map page, and then individual LBAs can be identified and retrieved based on the PBA information in the associated second level entries. The first level map 142 can thus be thought of as a forward map to enable retrieval of the associated map page associated with a desired MU.

Figure 7:
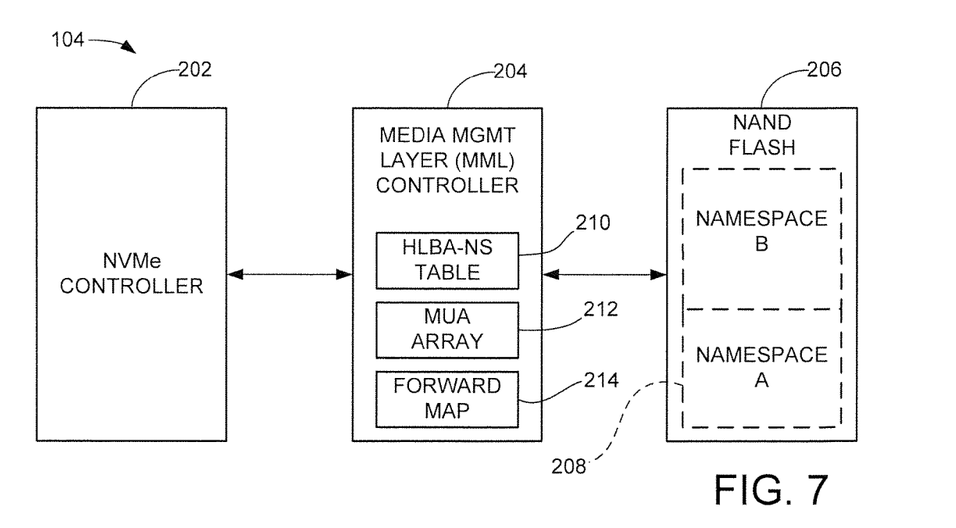
FIG. 7 illustrates an NVMe controller and a media management layer (MML) controller configured to manage namespaces of the SSD in some embodiments.

FIG. 7 shows further aspects of the SSD 104 in accordance with some embodiments. An NVMe (Non-Volatile Memory Express) controller 202 communicates with a media management layer (MML) controller 204 to transfer data to and from the NVM, which is identified in this case as NAND flash memory 206. It is contemplated that the NVMe controller 204 will form a portion of the core controller 114 and the MML controller 204 will form a portion of the back end controller 116 in FIG. 2, although other arrangements can be used.

Per the NVMe standard, that portion of the NAND flash 206 available for storage of data blocks (MUs 130) is divided into a number of namespaces 208. Two such exemplary namespaces are identified as namespace (NS) A and NS B. Each namespace has an associated total amount of block storage capacity. Data transfers via the PCIe interface protocol include values from the host that indicate the HLBA values, the namespace to which the data are to be stored to/retrieved from, and the namespace controller ID associated with the NVMe controller 202.

To facilitate the efficient management of the namespaces 208, the MML controller 204 utilizes certain data structures in local memory including an HBLA-NS conversion table 210, a forward map 212 and an MUA array 214. Each of these will be discussed in turn.

Figure 8:
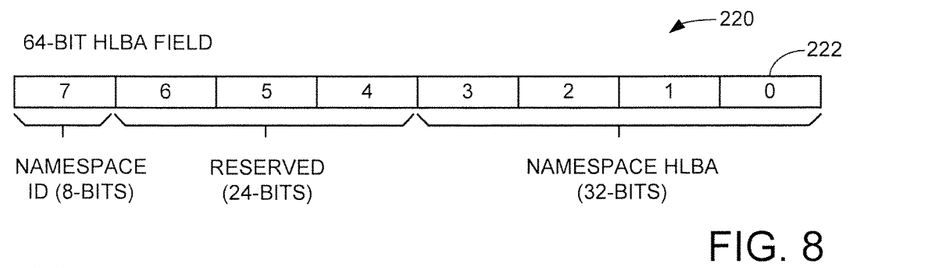
FIG. 8 is an exemplary format for an HLBA field configured to maintain namespace ID and namespace HLBA data.
Figure 9:
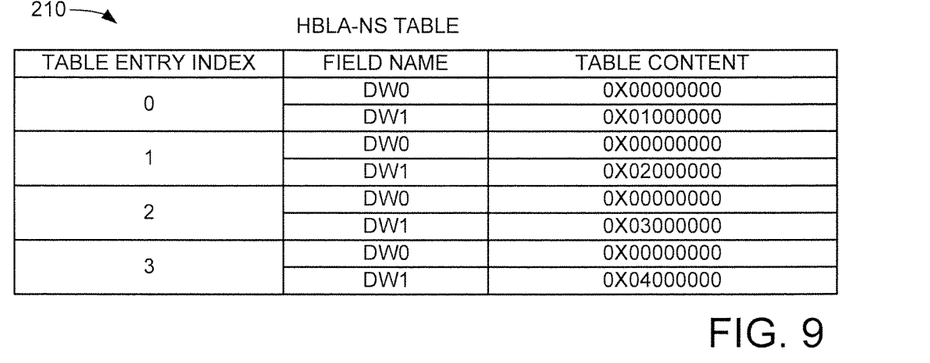
FIG. 9 is an exemplary format for a conversion table used to encode the data of FIG. 8.

As part of this namespace management scheme, the control data portion of each AU written to the NAND flash 206 is modified to store the namespace ID value associated with the data. To this end, a 64 bit HLBA field 220 is incorporated into the 1872B of data for each AU, as shown in FIG. 8. The field 220 is represented by eight (8) 8-bit (1B) blocks 222 numbered from 0 to 7.

The lower 32 bits of the 64-bit field (e.g., bytes 0-3) constitute an HLBA value (namespace HLBA) provided by the host. The MSB of the upper 32 bits (e.g., byte 7) is set to the namespace ID for the associated data. The remaining 3 bytes (e.g., bytes 4-6) are currently reserved in this embodiment, but can be used as required such as in systems that require more bits for namespaces, HLBAs or other control information.

The namespace ID is encoded into the HLBA field 220 by or under the direction of the MML controller 204 using the HLBA-NS conversion table 210. FIG. 8 shows an arrangement of the table 210 in some embodiments. Other forms can be used as required.

The decoding of the controller HLBA value into the namespace ID and namespace HLBA is performed solely within or by the MML controller 204. These two values are subsequently used to calculate a given MUA (e.g., index into the forward map) as discussed below. This calculation is performed during the servicing of host read/write operations, as well as during metadata recovery on power up and during garbage collection operations to relocate valid data and erase erasure blocks for reallocation.

Figure 10:
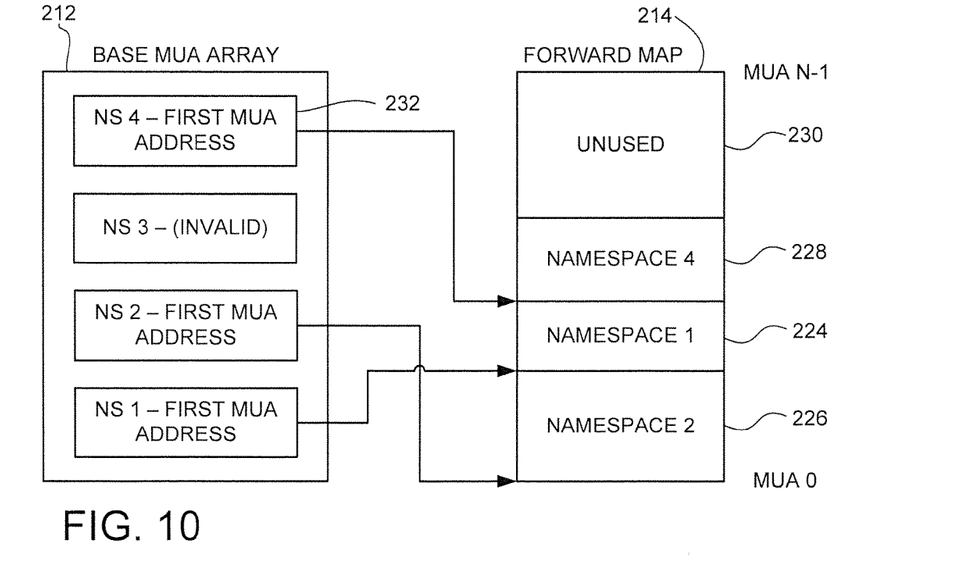
FIG. 10 shows a map unit address (MUA) array as a data structure used to access a forward map of the SSD in some embodiments.

FIG. 10 shows the MUA array 212 and the forward map 214 from FIG. 7 in greater detail in accordance with some embodiments. A total of four (4) namespaces can be accommodated (NS 1 to NS 4), while only three (3) namespaces are currently assigned as shown by NS 1, 2 and 4. The forward map 214 is arranged from MUA 0 (minimum MUA value or address at bottom) to MUA N−1 (maximum MUA value or address at top). The respective namespace ranges for NS 1, 2 and 4 are respectively identified at 224, 226 and 228. Block 230 represents an unused MUA range within the map. Each of the namespace ranges has a different total data block (MU) capacity established when the namespaces were formed. The HLBA values for each namespace may run from HLBA 0 to the maximum block value for that namespace.

As can be seen from FIG. 10, the namespaces in the NAND flash are described by contiguous and consecutive ranges of MUAs in the forward map 214. The MML controller 206 defines the MUA array 212 as an array of namespace base MUA values 232, each referred to as a base MUA for the corresponding namespace ID range. Each base MUA is an index into the array 212, and so all is needed to obtain a particular MUA is to locate the base MUA for the associated namespace and increment. The MUA at which a given MU is stored is obtained by adding the namespace HLBA to the value in the element of the Base MUA Array corresponding to the namespace ID. For example, to locate a selected MUA in NS 4, this can be determined as:

$$\text{Selected MUA}=\text{NS 4 First MUA Address}+\text{HLBA} \quad (1)$$

Because the location of an HLBA can change in the forward map as a result of namespace deletion, footer entries do not include absolute MUA values. Stated another way, a relative, rather than a static, correspondence is maintained between HLBA and MUA values. Consequently, footer entries, if used, should include the full 64-bit HLBA field 220 (FIG. 8) to ensure the system can always locate the forward-map MUA that references the associated MU data.

Figure 11:
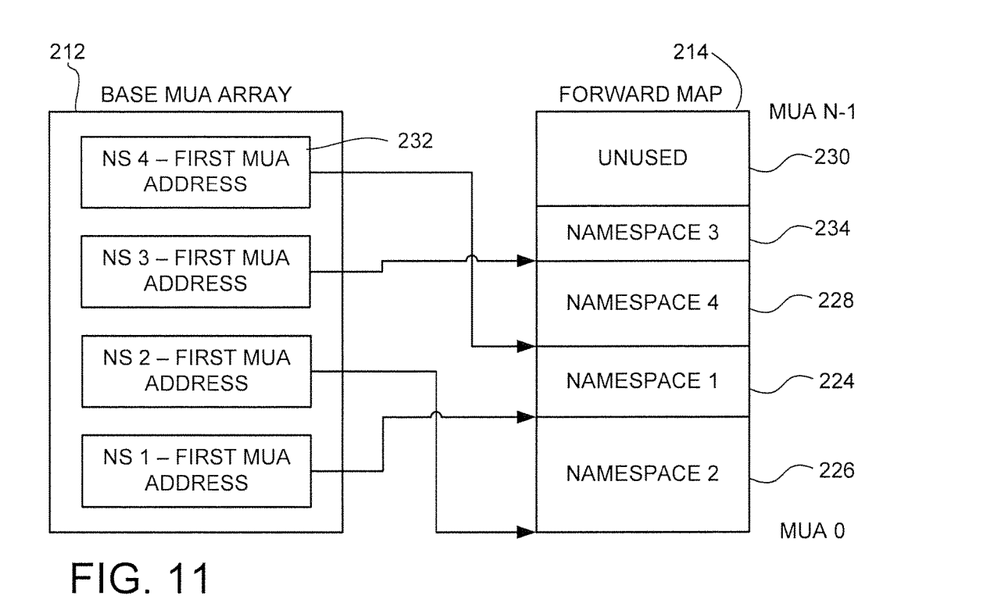
FIG. 11 shows an addition of a new namespace to the forward map.

FIG. 11 shows the MUA array 212 and forward map 214 of FIG. 10 with the addition of a new namespace 234 (NS 3). It can be seen that the new namespace 234 is added beginning with the next available MUA, in this case, the next MUA after the last MUA in the fourth namespace 228 (NS 4). The pointer for NS 3 now identifies the first MUA address for the third namespace 234.

Figure 12:
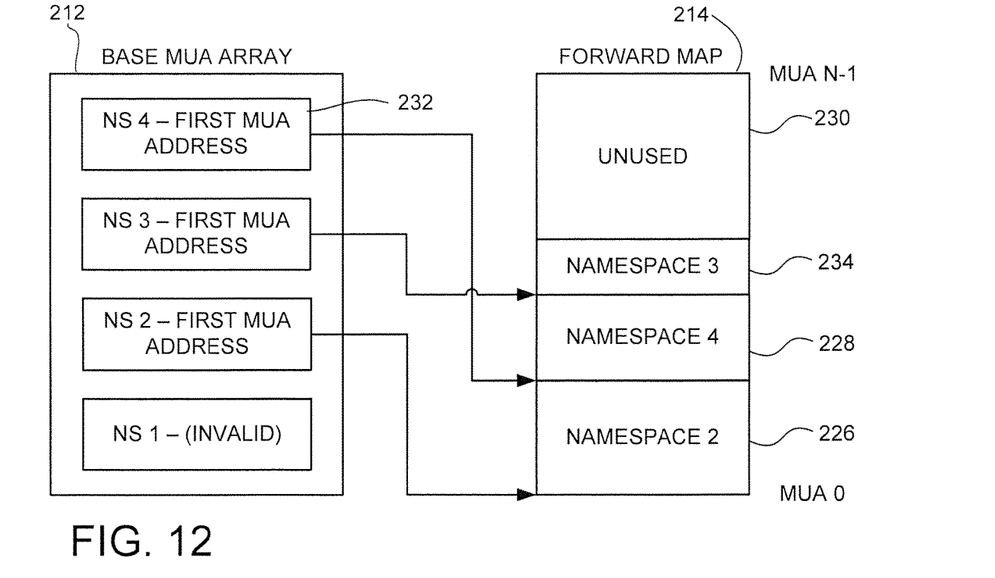
FIG. 12 shows the deletion of a namespace from the forward map.

FIG. 12 shows the MUA array 212 and forward map 214 of FIG. 12 upon deletion of the first namespace 224 (NS 1). The second namespace 226 (NS 2) remains as before, but the fourth namespace 228 (NS 4) and third namespace 234 (NS 3) are each shifted down to maintain continuity and prevent fragmentation within the map 214. The status of the NS 1 has been set to invalid.

In this way, the beginning MUA entry for NS 4 has shifted down to correspond to the intermediate address previously occupied by the beginning MUA entry for (removed) NS 1. The corresponding base MUA entry (pointer) 232 for NS 4 now points to this intermediate address (e.g., the entry that was previously occupied by the first entry for NS 1).

Pointers are adjusted to continue to point to the locations in the physical memory for the map pages.

To support multiple namespaces in this manner, a number of interfaces changes to the NVMe command set may be required, as exemplified by Table I.

TABLE I

| Command | Change | Status |
| --- | --- | --- |
| HOST_OP_FORMAT | Provide namespace ID of the specific namespace to format (or 0xFFFFFFFF for all). | Change |
| HOST_OP_READ/ HOST_OP_WRITE/ HOST_DATA_SET_MANAGEMENT/ HOST_OP_WRITE_UNC/ HOST_OP_TRIM_ZERO | Provide namespace ID of the specific namespace. | Change |
| HOST_OP_CREATE_NS | Create a new namespace. | New |
| HOST_OP_DELETE_NS | Delete an existing namespace. | New |
| HOST_OP_FLUSH | The NVMe flush command includes namespace ID, but it is not necessary for MML to see this command as it maintains protection for early write status data. | N/A |

The NVMe controller 202 will block I/O commands to the MML controller 204 for namespaces that are not active or attached. The NVMe controller will return an error immediately for these commands, and the MML controller will not see the host requests. The NVMe controller 202 will also implement support for the Namespace Attachment command which implements both namespace attach and detach. The MML controller 204 will not see these commands, as they simply enable or disable access to the namespace from a given port.

Upon the initial formatting of the SSD 104, only the first namespace (NS 1) will be defined, and this namespace will extend to the entire data capacity of the NVM (NAND flash 206). The base MUA array 212 will be generated within the EB File, along with other major MML tables, and an EB-File save operation will be triggered with any creation or deletion of a namespace. It will be appreciated that the MML controller 204 will require handlers for subsequent namespace creation and namespace deletion commands sent from the NVMe controller 202.

Figure 13:
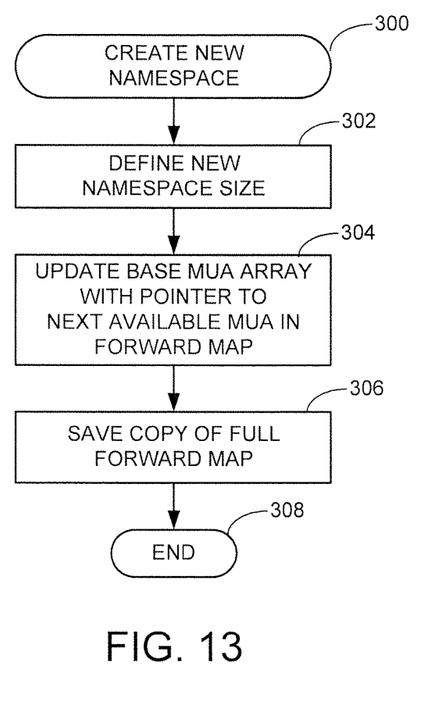
FIG. 13 is a flow chart for a create new namespace routine.

FIG. 13 shows a flow chart for a create new namespace routine 300 generally illustrative of steps carried out to add a new namespace to an existing NVM. It is contemplated that the request for the new namespace will originate at the host level, although such is not necessarily required.

The new namespace characteristics are defined at step 302, which will include the total number of blocks (e.g., the size) to be contained within the new namespace. At step 304, the base MUA array 212 is updated to reflect the newly added namespace, along with a pointer to the next available MUA in the forward map 214. At step 306, a full copy of the forward map is saved to NVM, and the routine ends at step 308.

In this way, new namespace creation generally entails the following operations, in order: the updating of the base MUA array 212 element for the namespace being created with the next available MUA on the forward map, followed by the triggering of a full forward-map/EB-File table save.

Figure 14:
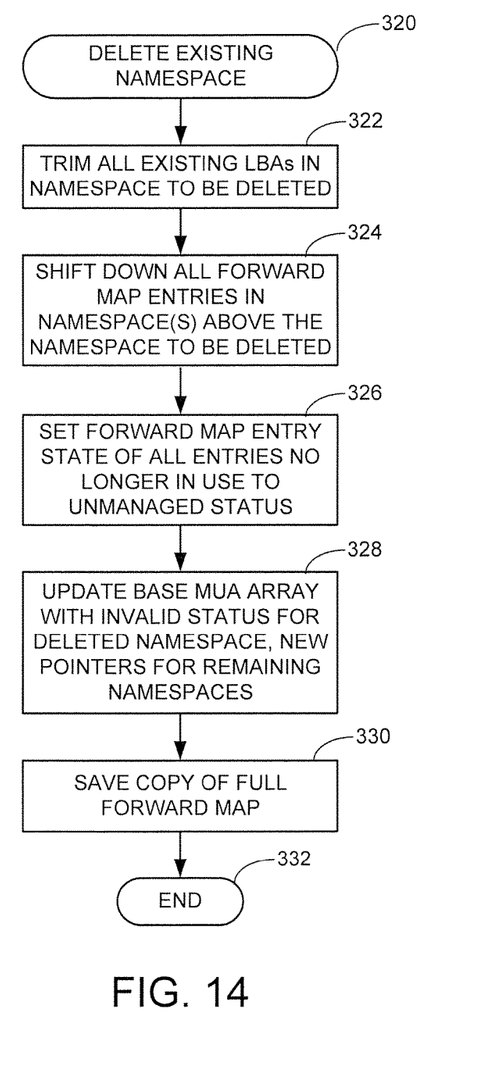
FIG. 14 is a flow chart for a delete existing namespace routine.

FIG. 14 shows a flow chart for a delete existing namespace routine 320. As before, it is contemplated that the request to delete an existing namespace will originate from the host level, although such is not required.

At step 322, all existing LBAs that are resident in local memory are trimmed, or processed so as to be written to the NVM prior to the deletion of the namespace. Next, step 324 shifts down all of the forward map entries above the deleted namespace, as discussed above in FIG. 12. The forward map entry state of all entries no longer in user are set to an unmanaged status, step 326.

At step 328, the base MUA array 212 is updated to show the deleted namespace as invalid and, as required, new base values are updated to point to the new starting locations in the forward map. Finally, a full copy of the map is saved at step 330, and the routine ends at step 332.

In this way, the deletion of an existing namespace generally entails the following operations, in order: trimming of all controller LBAs in the namespace to be deleted; use of DMA circuitry (such as the hardware assist manager 120, FIG. 2) to shift all forward-map entries in namespaces above the one being deleted down to the base MUA of the namespace being deleted; setting of the forward-map entry state of all forward map entries no longer in use due to the namespace deletion to Unmapped; updating of the base MUA array 212 by setting the entry for the deleted namespace to an invalid value, and entries for all shifted namespaces to their respective new locations; and the triggering of a full forward-map/EB-File table save.

NVMe commands that act on namespace HLBAs, or ranges of namespace HLBAs, also need to have the HLBA (s) translated by the MML controller 206 into MUA values. Such commands include format, trim, deallocate, write zeros, and dataset management. For the case of the format command, only the HLBAs in the target namespace are deallocated. If the NVMe controller 202 requests all namespaces to be formatted, the MML controller 206 will do so by looping through all defined namespaces.

Figure 15:
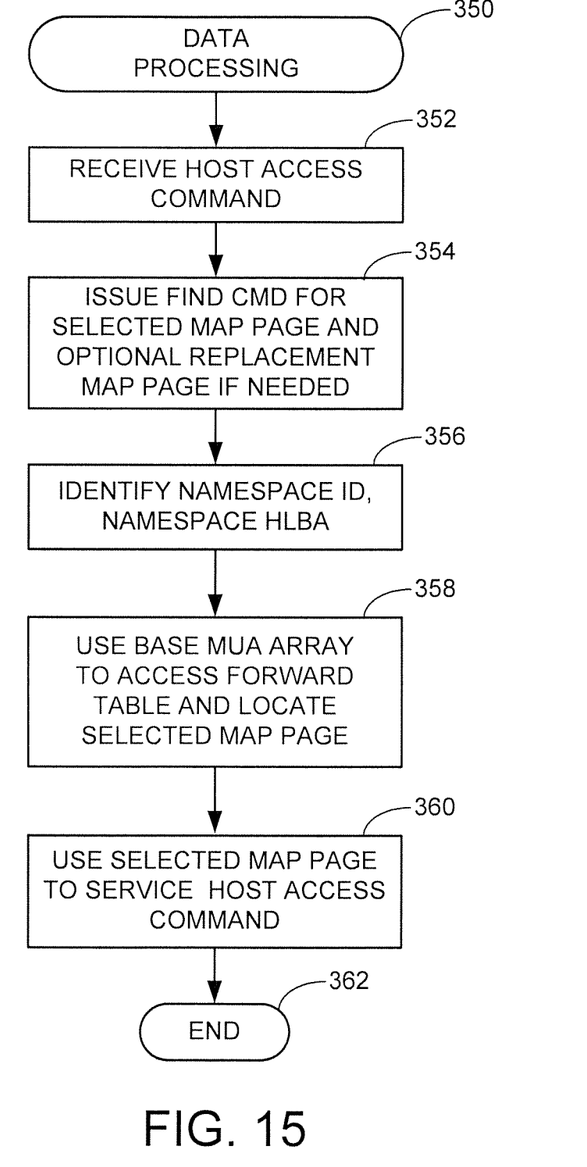
FIG. 15 is a flow chart for a data processing routine illustrative of steps carried out in accordance with various embodiments of the present disclosure

FIG. 15 is a flow chart for a data processing routine 350 generally indicative of steps carried out by the SSD 104 to transfer data between the NVM 206 and the host device 102 in a situation where the NVM has multiple namespaces, as discussed above in FIGS. 7 and 10-12. Other sequences can be used.

A host access command is received at step 352 via the PCIe port from the host device 102, such as but not limited to a data read command. After initial processing by the front end controller 112, the MVMe controller 202 may operate to issue a find command for one or more selected map pages associated with the data associated with the command, step 354.

The command is forwarded to the MML controller 206 which identifies the namespace ID and HLBA elements, step 356, and uses these elements in conjunction with the base MUA array 212 to locate the selected MUA within the forward map, step 358. Once retrieved, the map page is used to locate the data within the physical memory (e.g. page 132) and the command is serviced, such as by reading back, processing and returning the requested data to the host, step 360, after which the routine ends at step 362.

Advantages of the various embodiments set forth herein include the fact that the HLBA-NS namespace table 210 allows metadata to be unique in the NVM as well as during handling by the respective controllers. The maintained continuity of the forward map 214 removes the need for secondary lookup operations to account for fragmented sections within the map, since the forward map is divided into HLBA contiguous namespaces. Another advantage is that fast-path latency effects are largely avoided. Delays are generally only encountered during namespace delete operations where the forward map is compacted for the removed namespace(s). In some cases, even during this operation accesses may be permitted in some cases to the unaffected namespace(s) such as the second namespace (NS 2) in FIG. 12 that does not undergo recalculation.

While various embodiments have contemplated the environment of a solid state drive (SSD) with flash memory, other configurations can readily be used including different forms of storage memory, different numbers of devices, etc.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
 a non-volatile memory (NVM) configured to store map units (MU) comprising addressable blocks of user data within at least one namespace in the NVM;
 a Non-Volatile Memory Express (NVMe) controller circuit configured to interface with a host device to transfer the MUs between the host device and the NVM;
 a forward map stored as a data structure in a local memory comprising map unit address (MUA) entries that correlate each of the MUs with the physical locations in the NVM at which the MUs are stored, the MUA entries sequentially arranged from a lowest address to a highest address within the forward table and grouped into immediately adjacent, contiguous ranges for each of the at least one namespace in the NVM;
 a base MUA array stored as a data structure in the local memory configured to identify the address, within the forward map, of the beginning MUA entry for each of the at least one namespace in the NVM; and
 a media management layer (MML) controller circuit configured to add a new namespace to the NVM by appending a new range of the MUA entries to the forward map immediately following the last MUA entry, within the forward map, of the previously most recently added namespace, and by adding a new entry to the base MUA array to identify the address, within the forward map, of the beginning MUA entry for the new namespace, the MML controller circuit further configured to subsequently delete the previously most recently added namespace from the NVM by removing the corresponding entry in the base MUA array that identified a first intermediate address, within the forward map, of the beginning MUA entry of the previously most recently added namespace, by shifting the associated range of the MUA entries down so that the beginning MUA entry for the new namespace corresponds to the first intermediate address within the forward map, and by modifying the base MUA array so that the entry associated with the new namespace identifies the first intermediate address in the forward map.

2. The apparatus of claim 1, wherein a first namespace in the NVM has a beginning MUA entry corresponding to the lowest address in the forward map and an ending MUA entry at a first intermediate address in the forward map, and a second namespace in the NVM has a beginning MUA entry at a second intermediate address that is immediately adjacent the first intermediate address in the forward map.

3. The apparatus of claim 1, wherein the MLL controller circuit is further configured to service a pending host command received from the NVMe controller circuit by identifying a selected namespace associated with the pending host command, accessing the base MUA array to locate the address within the forward map of the beginning MUA entry for the selected namespace, to locate the associated MUA entry within the forward map associated with the pending host command by incrementing up a number of entries from the beginning MUA entry for the selected namespace responsive to a logical address associated with the pending host command, and using the associated MUA entry to identify a physical location within the NVM to which data are written or from which data are retrieved to complete the servicing of the pending host command.

4. The apparatus of claim 1, further comprising a conversion table stored as a data structure in the local memory, wherein the MML controller circuit appends an MU received from the NVMe controller with a namespace ID value for a selected namespace within the NVM associated with the MU.

5. The apparatus of claim 4, wherein the MML controller circuit further appends the MU received from the NVMe controller with a logical address associated with the MU.

6. The apparatus of claim 5, and wherein the MML controller circuit accesses the base MUA array responsive to the namespace ID from the conversion table and increments from the base MUA entry associated with the namespace ID by a distance corresponding to the logical address from the conversion table.

7. The apparatus of claim 1, wherein the NVMe controller circuit and the MML controller circuit are realized using at least one programmable processor and associated programming stored in a processor memory and executed by the associated at least one programmable processor.

8. The apparatus of claim 1, wherein each MU is configured to store 4096 bytes (B) of user data from the host device and is formed from multiple data blocks from the host device each having a separate logical address appended to the MU by the MML controller circuit.

9. The apparatus of claim 1, characterized as a solid state drive (SSD) wherein the NVM comprises NAND flash memory.

10. A method comprising:
 arranging a non-volatile memory (NVM) into one or more namespaces each configured as a Non-Volatile Memory Express (NVMe) namespace to store map units (MU) comprising addressable blocks of user data from a host device;
 storing a forward map as a data structure in a local memory comprising map unit address (MUA) entries that correlate each of the MUs with the physical locations in the NVM at which the MUs are stored, the MUA entries sequentially arranged from a lowest address to a highest address within the forward table and grouped into immediately adjacent, contiguous ranges for each of the at least one namespace in the NVM;

generating a base MUA array as a data structure in the local memory which identifies the address, within the forward map, of the beginning MUA entry for each of the one or more namespaces in the NVM;

adding a new namespace to the NVM by appending a new range of the MUA entries to the forward map immediate following the last MUA entry, within the forward map, of the previously most recently added namespace, and by adding a new entry to the base MUA array to identify the address, within the forward map, of the beginning MUA entry for the new namespace; and subsequently servicing a pending host command received from the host device by identifying a selected namespace associated with the pending host command, accessing the base MUA array to locate the address within the forward map of the beginning MUA entry for the selected namespace, locating the associated MUA entry within the forward map associated with the pending host command by incrementing up a number of entries from the beginning MUA entry for the selected namespace responsive to a logical address associated with the pending host command; and using the associated MUA entry to identify a physical location within the NVM to which data are written or from which data are retrieved to complete the servicing of the pending host command.

11. The method of claim 10, further comprising a subsequent step of transferring a selected MU between the host device and the new namespace NVM using the forward map and the base MUA array.

12. The method of claim 10, wherein the adding step is performed by a media management layer (MML) controller circuit configured to direct data transfers with the NVM responsive to commands received from an NVMe controller circuit.

13. The method of claim 12, wherein the NVMe controller circuit and the MML controller circuit are realized using at least one programmable processor and associated programming stored in a processor memory and executed by the associated at least one programmable processor.

14. The method of claim 10, wherein a first namespace in the NVM has a beginning MUA entry corresponding to the lowest address in the forward map and an ending MUA entry at a first intermediate address in the forward map, and a second namespace in the NVM has a beginning MUA entry at a second intermediate address that is immediately adjacent the first intermediate address in the forward map.

15. The method of claim 10, further comprising a subsequent step of deleting the previously most recently added namespace from the NVM by:

removing the corresponding entry in the base MUA array that identified a first intermediate address, within the forward map, of the beginning MUA entry of the previously most recently added namespace;

shifting the associated range of the MUA entries down so that the beginning MUA entry for the new namespace corresponds to the first intermediate address within the forward map; and modifying the base MUA array so that the entry associated with the new namespace identifies the first intermediate address in the forward map.

16. The method of claim 10, further comprising:

accessing the base MUA array responsive to a namespace ID from a conversion table to locate the base MUA entry for the selected namespace within the forward map; and incrementing from the base MUA entry for the selected map by a number of MUA entries corresponding to the logical address from the conversion table.

17. An apparatus comprising:

a non-volatile memory (NVM) arranged to store data blocks in a plurality of NVMe (Non-Volatile Memory Express) namespaces, each namespace associated with a different host device;

a forward map stored as a data structure in a local memory which correlates logical addresses of the data blocks with physical addresses in the NVM at which the data blocks are stored, the logical addresses of the forward table grouped into contiguous ranges for each of the NVMe namespaces in a selected order;

a base MUA array stored as a data structure in the local memory configured with pointers to identify a beginning logical address for each NVMe namespace; and a controller circuit configured to delete an existing NVMe namespace by performing a sequence comprising trimming the data blocks associated with the existing NVMe namespace to be deleted, shifting all forward map entries in a portion of the remaining NVMe namespaces above the existing NVMe namespace to be deleted down to the beginning address of the NVMe namespace to be deleted, updating the base MUA array by adjusting the pointers for the portion of the remaining NVMe namespaces above the existing NVMe namespace to be deleted, and updating and saving a copy of the forward map to the NVM.

18. The apparatus of claim 17, wherein the controller circuit is further configured to add a new NVMe namespace to the NVM by appending a new range of the MUA entries to the forward map and by adding a new entry to the base MUA array to identify the logical address corresponding to a beginning data block of the new NVMe namespace.

19. The apparatus of claim 17, wherein a first namespace in the NVM has a beginning MUA entry corresponding to the lowest address in the forward map and an ending MUA entry at a first intermediate address in the forward map, and a second namespace in the NVM has a beginning MUA entry at a second intermediate address that is immediately adjacent the first intermediate address in the forward map.

20. The apparatus of claim 17, further comprising a conversion table stored as a data structure in the local memory, wherein the MML controller circuit appends an MU received from the NVMe controller with a namespace ID value for a selected namespace within the NVM associated with the MU, wherein the MML controller circuit further appends the MU received from the NVMe controller with a logical address associated with the MU, and wherein the MML controller circuit accesses the base MUA array responsive to the namespace ID from the conversion table and increments from the base MUA entry associated with the namespace ID by a distance corresponding to the logical address from the conversion table.

* * * * *